(12) United States Patent
Joi et al.

(10) Patent No.: US 10,332,052 B2
(45) Date of Patent: Jun. 25, 2019

(54) INTERACTIVE MEETING AGENDA

(71) Applicant: Workplace Dynamics, LLC, Exton, PA (US)

(72) Inventors: Richard Johnson Joi, Lancaster, PA (US); Anthony Douglas Moquin, Glenmoore, PA (US); Douglas J. Claffey, Malvern, PA (US); Mark Daniel Suwyn, Savannah, GA (US); John W. Quillen, Jr., Malvern, PA (US)

(73) Assignee: Workplace Dynamics, LLC

( * ) Notice: Subject to any disclaimer, the term of this patent is extended or adjusted under 35 U.S.C. 154(b) by 478 days.

(21) Appl. No.: 14/932,017

(22) Filed: Nov. 4, 2015

(65) Prior Publication Data

US 2016/0124593 A1 May 5, 2016

Related U.S. Application Data

(60) Provisional application No. 62/075,097, filed on Nov. 4, 2014.

(51) Int. Cl.
*G06F 21/00* (2013.01)
*G06Q 10/06* (2012.01)

(52) U.S. Cl.
CPC .............. *G06Q 10/06312* (2013.01)

(58) Field of Classification Search
CPC .......... G06F 21/00; G06F 17/30; G06F 17/60; G06Q 40/00; G06Q 10/1095; G06Q 10/10; G06Q 99/00
See application file for complete search history.

(56) References Cited

U.S. PATENT DOCUMENTS

| | | |
|---|---|---|
| 5,878,214 A | 3/1999 | Gilliam et al. |
| 7,392,197 B1 | 6/2008 | Fliess et al. |
| 7,720,737 B2 | 5/2010 | D'Alessandro |
| 8,195,497 B2 | 6/2012 | Montgomery |
| 8,266,534 B2 * | 9/2012 | Curtis ............... G06Q 10/10 705/7.15 |
| 8,935,312 B2 | 1/2015 | Gartner et al. |
| 2003/0004967 A1 | 1/2003 | Calderaro et al. |
| 2003/0078804 A1 | 4/2003 | Morrel-Samuels |
| 2004/0267794 A1 | 12/2004 | Might |
| 2005/0125246 A1 * | 6/2005 | Muller ............... G06Q 10/10 705/300 |

(Continued)

OTHER PUBLICATIONS

An Agenda App for an IPad, http://agendasapp.com.

(Continued)

*Primary Examiner* — Rashawn N Tillery
(74) *Attorney, Agent, or Firm* — The Belles Group, P.C.

(57) ABSTRACT

In one embodiment, the invention can be a method including receiving a first list of agenda items for a meeting, the first list of agenda items organized in a first order; transmitting the first list of agenda items to user interfaces of meeting participants; providing, to each user interface, access to predetermined item rating options; receiving, from the meeting participants in real-time, item ratings for at least one of the agenda items of the first list; and transmitting, to each user interface, a second list of agenda items for the meeting, the second list comprising a second list of agenda items organized in a second order; wherein the second order of the second list of agenda items is based on the item ratings.

19 Claims, 8 Drawing Sheets

(56) References Cited

U.S. PATENT DOCUMENTS

| | | |
|---|---|---|
| 2006/0173785 A1 | 8/2006 | Behbehani |
| 2007/0168247 A1 | 7/2007 | Robbins |
| 2007/0271337 A1 | 11/2007 | Olson |
| 2007/0282663 A1* | 12/2007 | Barlament ............ G06Q 10/10 |
| | | 705/300 |
| 2008/0147706 A1* | 6/2008 | Anglin .................. G06Q 10/10 |
| 2008/0162244 A1* | 7/2008 | Oral ................ G06Q 10/06311 |
| | | 705/7.19 |
| 2008/0010351 A1 | 10/2008 | Wardhaugh et al. |
| 2008/0249787 A1* | 10/2008 | Harrison ............... G06Q 10/10 |
| | | 705/1.1 |
| 2008/0288331 A1 | 11/2008 | Magids et al. |
| 2009/0327434 A1 | 12/2009 | Reynolds |
| 2010/0023377 A1 | 1/2010 | Sheridan |
| 2010/0262466 A1 | 10/2010 | Smith et al. |
| 2011/0047213 A1* | 2/2011 | Manuel ................. G06Q 30/00 |
| | | 709/204 |
| 2012/0047000 A1 | 2/2012 | O'Shea et al. |
| 2013/0117060 A1 | 5/2013 | Henriksen et al. |
| 2013/0198815 A1 | 8/2013 | Piliouras |
| 2013/0325779 A1* | 12/2013 | Shahshahani ........... G06N 5/02 |
| | | 706/46 |
| 2014/0100922 A1 | 4/2014 | Aycock |
| 2014/0278783 A1 | 9/2014 | Du |
| 2014/0344702 A1* | 11/2014 | Edge .................. G06Q 10/1091 |
| | | 715/730 |
| 2015/0089399 A1 | 3/2015 | Megill et al. |
| 2015/0154291 A1* | 6/2015 | Shepherd .......... G06F 17/30861 |
| | | 707/748 |
| 2015/0271206 A1* | 9/2015 | Schultz ............... G06F 21/6236 |
| | | 726/3 |
| 2016/0092578 A1* | 3/2016 | Ganani .................. G06Q 10/10 |
| | | 707/728 |
| 2016/0117624 A1* | 4/2016 | Flores .............. G06Q 10/06393 |
| | | 705/7.39 |
| 2016/0124593 A1 | 5/2016 | Joi et al. |

OTHER PUBLICATIONS

KickStart Alliance Interactive Meetings Exponential Results, http://www.kickstartall.com/resources/archives/interactive-meetings-exponential-results/.

International Search Report for corresponding Application No. PCT/US2018/025832, dated Jun. 22, 2018. WO.

U.S. Non-Final Office Action in corresponding U.S. Appl. No. 14/931,985, dated May 24, 2018. US.

* cited by examiner

22 ⟶

Weekly tactical minutes - September 22nd (SLT) ⟵ 60

53 ⟶ Meeting began at 10:33 am

1. Check-in (sharing: 5 minutes)
2. General updates (sharing: 22 minutes)
3. Financial update (sharing: 6 minutes)
48 ⟶ ——— Initial numbers look good
4. Ad hoc topic prioritization (sharing: 4 minutes)
5. Office space planning (Dan King, decision: 46 minutes)
6. Break (Rick Jones, other: 6 minutes)
7. SLT off-site planning (Dan King, decision: 6 minutes)
   Plan to make it one day on Thursday starting mid-morning after
   Pittsburgh flight. Plan to talk about 2015 plan on October 16th
8. 2015 budget cycle (Rick Jones, other: 5minutes)
   Dan K and Tom to discuss process. Meeting 10/16 as a group to discuss
   deadline of November 7th to send to board
9. NYC event next week (Dan King, decision: 3 minutes)
   Dan K to say not but bring up us presenting at a future event
10. CFO Alliancce de-brief (Dan King, sharing: 11 minutes)
11. All-hands topics (planning: 6 minutes)
12. Check-out (wrap-up: 4 minutes)

Meeting ended at 12:35 pm.

Parked topic: WI boot camp update (5 minutes)

INTERACTIVE MEETING AGENDA

CROSS REFERENCE TO RELATED APPLICATIONS

The present application claims priority to U.S. Provisional Patent Application No. 62/075,097 filed Nov. 4, 2014, the entirety of which is incorporated herein by reference.

BACKGROUND

Agendas are helpful for organizing the items to be addressed at a meeting. But often meeting agendas do not reflect the preferences of meeting participants. For example, an important topic may not be included in an agenda, or may be placed at the end of the agenda such that time constraints may prevent the topic from being addressed. There exists a need for a meeting agenda that can be altered based on participant feedback. Further, there exists a need for scoring and reordering items based on feedback.

BRIEF SUMMARY

The present disclosure is directed to methods and systems for organizing or reordering items. In one aspect, a method includes receiving a first list of agenda items for a meeting, the first list of agenda items organized in a first order; transmitting the first list of agenda items to user interfaces of meeting participants; providing, to each user interface of each meeting participant, access to predetermined item rating options for rating each agenda item; receiving, from the meeting participants in real-time, item ratings for at least one of the agenda items of the first list; and transmitting, to each user interface of each meeting participant in real-time, a second list of agenda items for the meeting, the second list comprising a second list of agenda items organized in a second order; wherein the second list of agenda items comprises agenda items from the first list of agenda items; and wherein the second order of the second list of agenda items is based on the item ratings.

In another aspect, a system includes meeting participant devices; a meeting administrator device; and a server configured to receive, from the meeting administrator device, a first list of agenda items for a meeting, the first list of agenda items organized in a first order; transmit to the meeting participant devices the first list of agenda items; transmit to the meeting participant devices access to item rating options for rating each agenda item; receive from the meeting participant devices item ratings for at least one of the agenda items of the first list; and transmit to the meeting participant devices a second list of agenda items for the meeting, the second list of agenda items comprising a second list of agenda items organized in a second order; wherein the second list of agenda items comprises agenda items from the first list of agenda items; and wherein the second order of the second list of agenda items is based on the item ratings.

In yet another aspect, a method includes providing, to each user interface of a plurality of users, items displayed in a first order; providing, to each user interface of the plurality of users, rating options for each item, the rating options corresponding with an ordinal scale; for each item, receiving item ratings from the plurality of users; for each item, determining a log it score based on the item ratings; and providing, to each user interface of the plurality of users, the items displayed in a second order, the second order based on the log it score determined for each item.

BRIEF DESCRIPTION OF THE DRAWINGS

The invention of the present disclosure will become more fully understood from the detailed description and the accompanying drawings, wherein:

FIG. 7 shows meeting minutes according to one embodiment.

DETAILED DESCRIPTION

Figure 1:
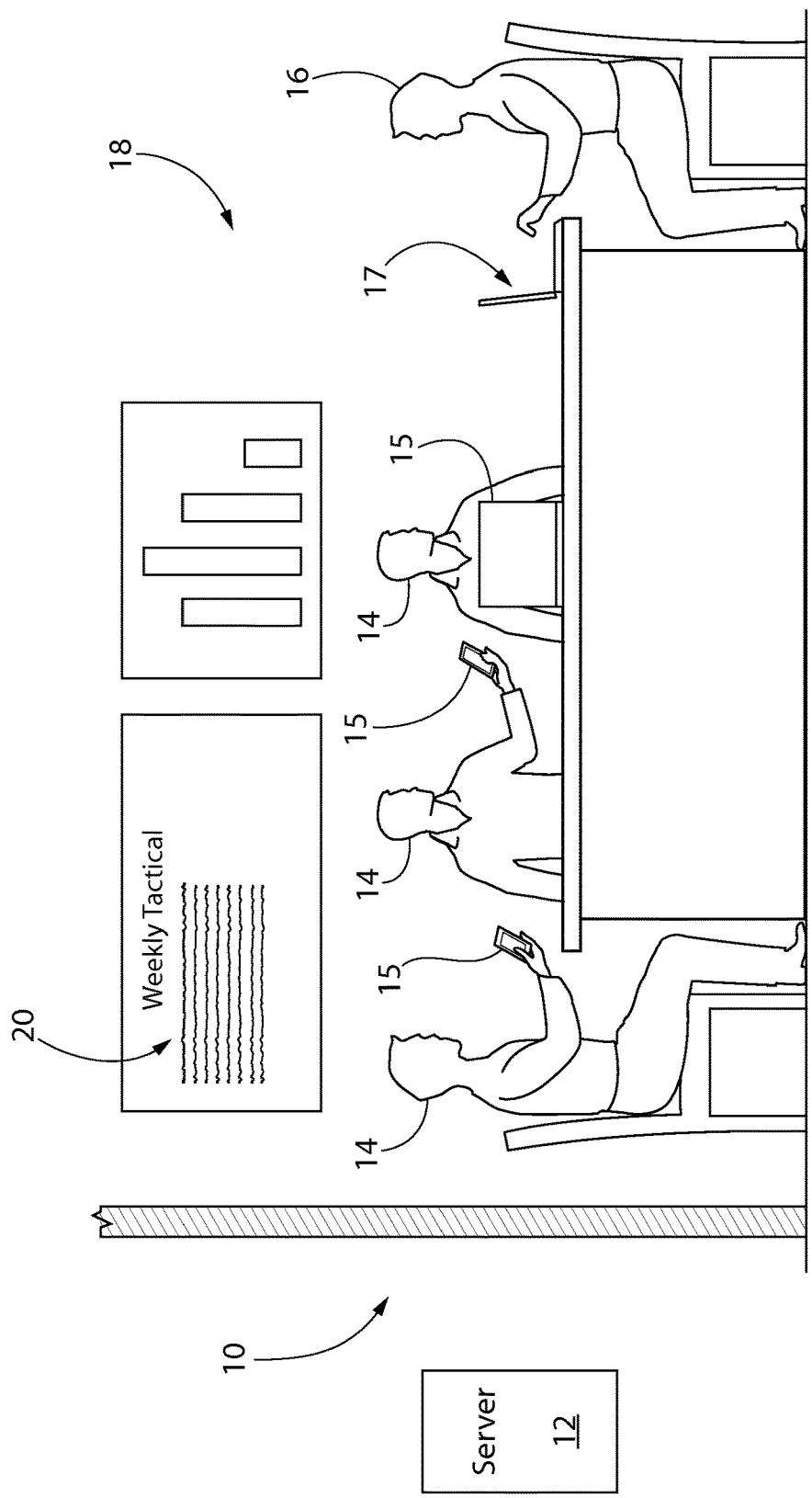
FIG. 1 shows a system according to one embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features. Furthermore, as used herein, the term "or" is to be interpreted as a logical operator that results in true whenever one or more of its operands are true.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to FIG. 1, a system 10 according to one embodiment is shown. This figure shows a meeting administrator 16 and meeting participants 14 seated in a meeting room 18. The system 10 includes a meeting administrator device 17 and meeting participant devices 15. A meeting agenda 20 can be visible to the meeting administrator 16 and meeting participants 14. The system 10 further includes a server 12, which can be in communication (wireless or otherwise) with the meeting administrator device 17 and meeting participant devices 15. The system 10 can enable the meeting participants 14 and meeting administrator 16 to provide real-time feedback regarding the meeting agenda 20. In other embodiments, those providing feedback (such as ratings) can be referred to generally as users or the plurality of users.

The meeting administrator device 17 and the meeting participant devices 15 can be any computer devices capable of carrying out programs in accord with the functions described herein (including laptop computers, desktop computers, and tablets). In the exemplified embodiment, the meeting participant devices 15 are laptop computers and mobile smartphones, and the meeting administrator device 17 is a laptop computer.

The server 12 can be any computer or processor (or collection thereof) for carrying out programs in accord with the functions described herein. In the exemplified embodiment, the server 30 communicates with meeting administrator device 17 and the meeting participant devices 15 through an internet connection and a router (not shown) providing wireless internet connection to the devices 15, 17. The invention is not so limited. In other embodiments, the server 12 can communicate with the devices 15, 17 through any standard communication means, including through use of a telecommunication network (e.g., 3G or 4G) or a wired internet connection (e.g., wired Ethernet cables).

Figure 2:
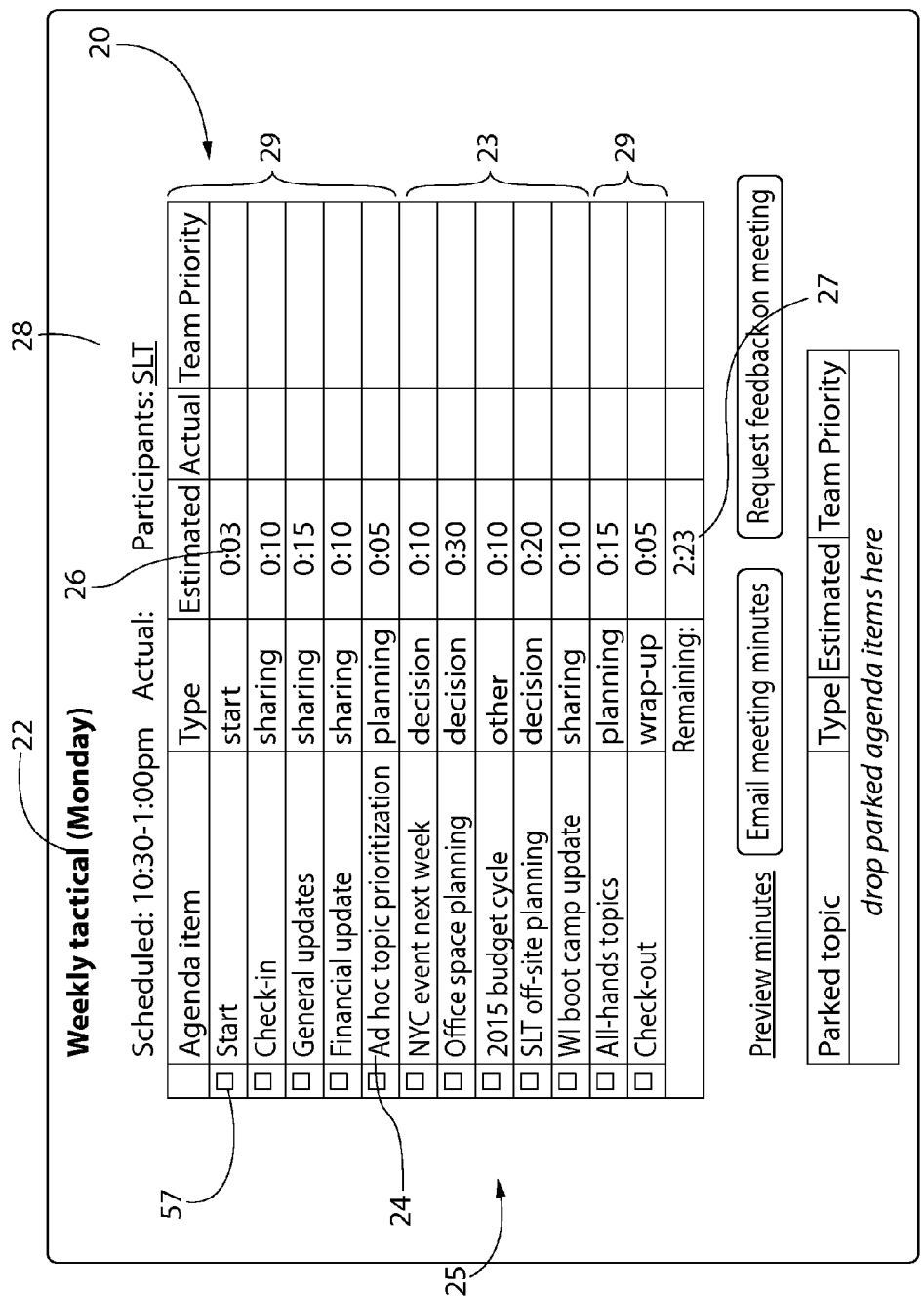
FIG. 2 shows a meeting agenda before a meeting according to one embodiment.

FIG. 2 shows a user interface 28 of a meeting participant providing a meeting agenda 20 before a meeting according to one embodiment. The meeting agenda 20 shows the meeting title 22. Further, the meeting agenda 20 shows a first list of agenda items 25 organized in a first order. This first list of agenda items 25 (and the other contents of the meeting agenda 20) can be transmitted (by the server or another device) to the user interfaces of meeting participants. The first list of agenda items 25 can be provided by any user. In the exemplified embodiment, the first list of agenda items 25 is provided by the meeting administrator device. In other embodiments, the items provided and capable of being reordered can be any topics, including survey topics.

Each agenda item 24 includes a name. An agenda item 24 can include further information, such as topic type, estimated time 26, and description. Further, the meeting agenda 20 can show as an estimated meeting time 27. If the estimated meeting time 27 will exceed the planned end time, this can be indicated (e.g., by having the relevant times turn red). Further, if the meeting starts late, this can be indicated (e.g., by text becoming red).

The meeting agenda 20 can include structural agenda items 29 that are not subject to item ratings or reordering. Structural agenda items can be any agenda items, including standard agenda items used at the beginning and end of most meetings, and other agenda items that a meeting administrator does not wish be subject to item ratings or reordering. Other, non-structural agenda items 23 can receive item ratings from meeting participants.

Each agenda item 24 can include a completion box 57. The meeting administrator or another user can select the completion box 57 during the meeting to indicate that an agenda item 24 has been completed. In other embodiments, other means can be used to indicate completion of an agenda item 24 and/or the beginning of a new agenda item.

Figure 3:
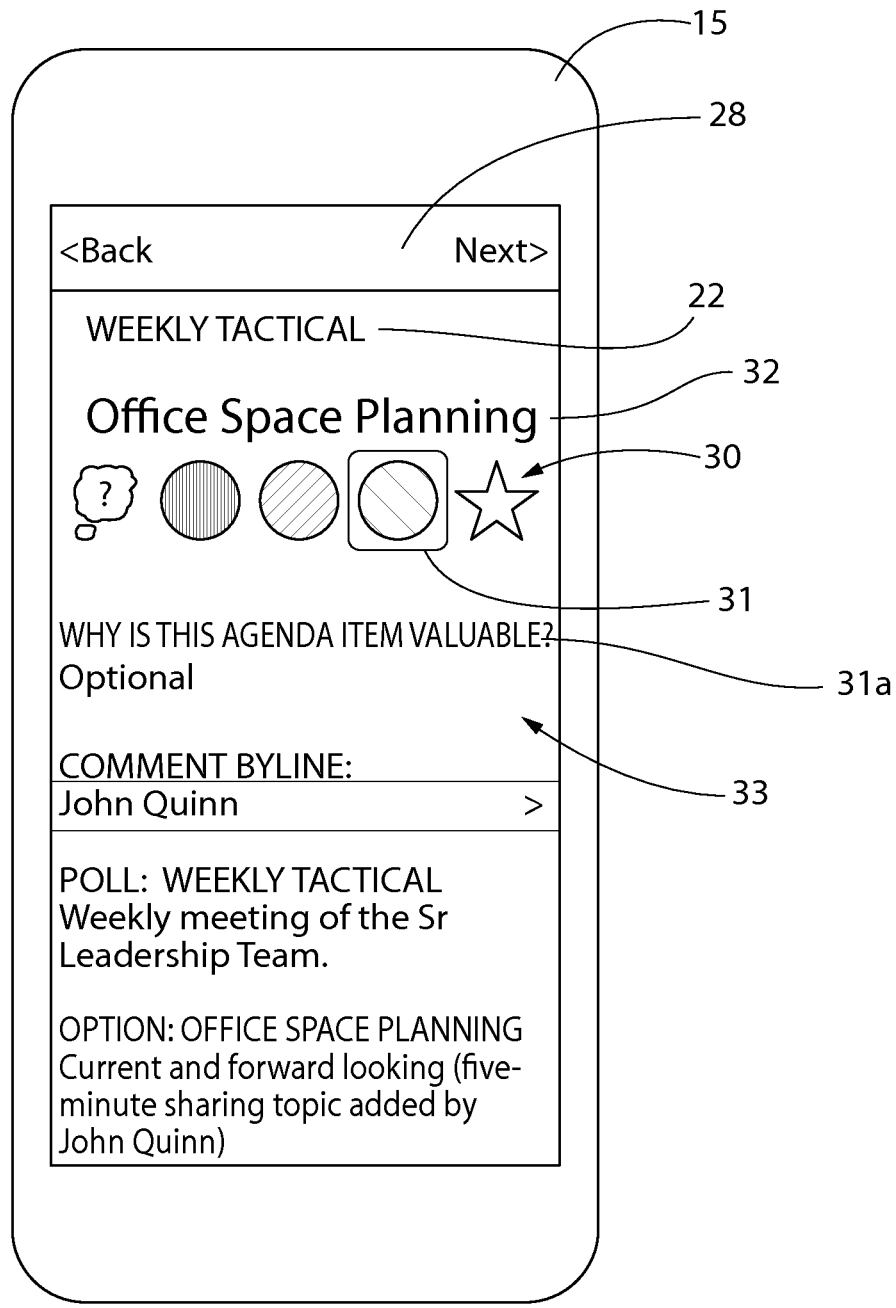
FIG. 3 shows a user interface of a meeting participant device according to one embodiment.

FIG. 3 shows a user interface 28 of a meeting participant device 15 according to one embodiment. The user interface 28 shows an item rating display 33 accessed by the meeting participant. The item rating display 33 shows the meeting title 22 and a selected agenda item 32. The item rating display 33 enables the meeting participant to rate the selected agenda item 32 by providing predetermined item rating options 30. The server (or another device) can provide each user interface of each meeting participant access to predetermined item rating options 30 for rating each agenda item. Further, the server (or another device) can receive from the meeting participants in real-time item ratings 31 for at least one of the agenda items of the first list. These item ratings 31 can be received before or during the meeting. As used herein, real time is understood to mean immediately or substantially immediately (e.g., within seconds).

In the exemplified embodiment, there are five item rating options 30 to choose from (from left to right): a question cloud, a red circle, an amber circle, a green circle, and a star, and the green circle item rating 31 has been selected. These options 103 represent different ratings regarding the important or value of the selected agenda item 32. In one embodiment, red can represent "Bad," amber can represent "Needs Improvement," green can represent "Good," and star can represent "Excellent." These the rating options 30 can correspond with an ordinal scale. In other embodiments, other item rating options having other meanings can be available.

Further, based on the item rating 31 chosen, a rating question 31*a* can be asked. In the exemplified embodiment, the item rating 31 is green/Good, and the rating question 31*a* is, "Why is this agenda item valuable?" Other questions for other item ratings can be available. For example, if red/Bad was chosen, the question could be, "Why is this agenda item not valuable?"

Figure 4:
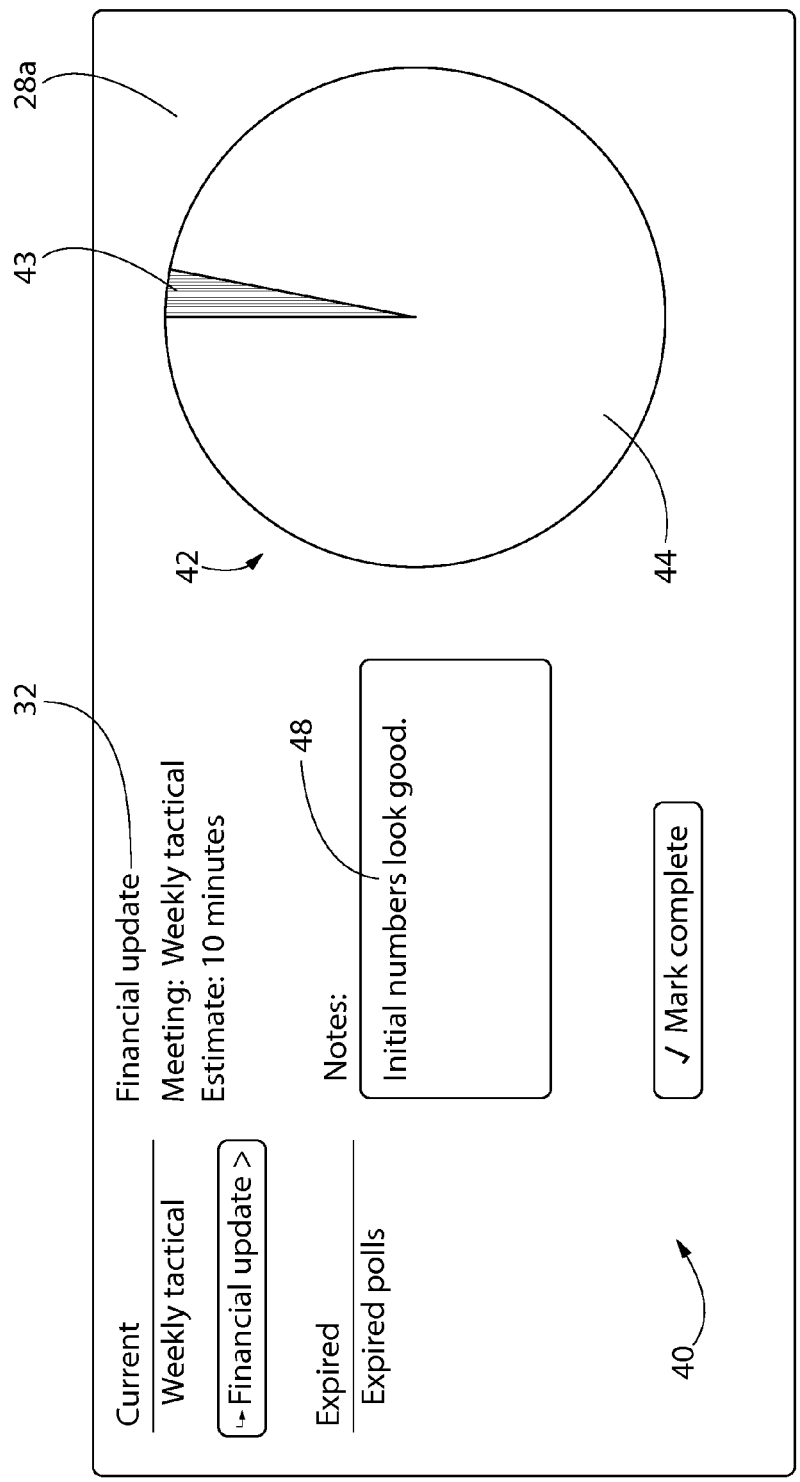
FIG. 4 shows a selected item display indicating time remaining according to one embodiment.

FIG. 4 shows a meeting administrator user interface 28a providing a selected item display 40 indicating time remaining according to one embodiment. When an agenda item is selected, the selected item display 40 can be provided. The selected item display 40 shows the selected agenda item 32. Further, it can provide a text box for inserting notes 48, and a button for marking the selected agenda item 32 complete. Further, the selected item display 40 can include a timer display 42 for indicating the time remaining and time elapsed for discussing the selected agenda item 32.

As shown in FIG. 2, each agenda item 24, can include a completion box 57 or other option for enabling a user to indicate that an agenda item 24 has been completed. When an agenda item 24 has been marked completed, the timer for the next agenda item can begin. The estimated time image 44 (a circle in the exemplified embodiment) indicates the estimated time for the selected agenda item 32. The time elapsed portion 43 (blue in the exemplified embodiment) indicates the amount of estimated time already used for the selected agenda item 32. In other embodiments, a clock image or other image could be used for the timer display 42. For in-progress agenda items, the time display 42 can graphically and continuously display how much of the estimated time has elapsed.

Figure 5:
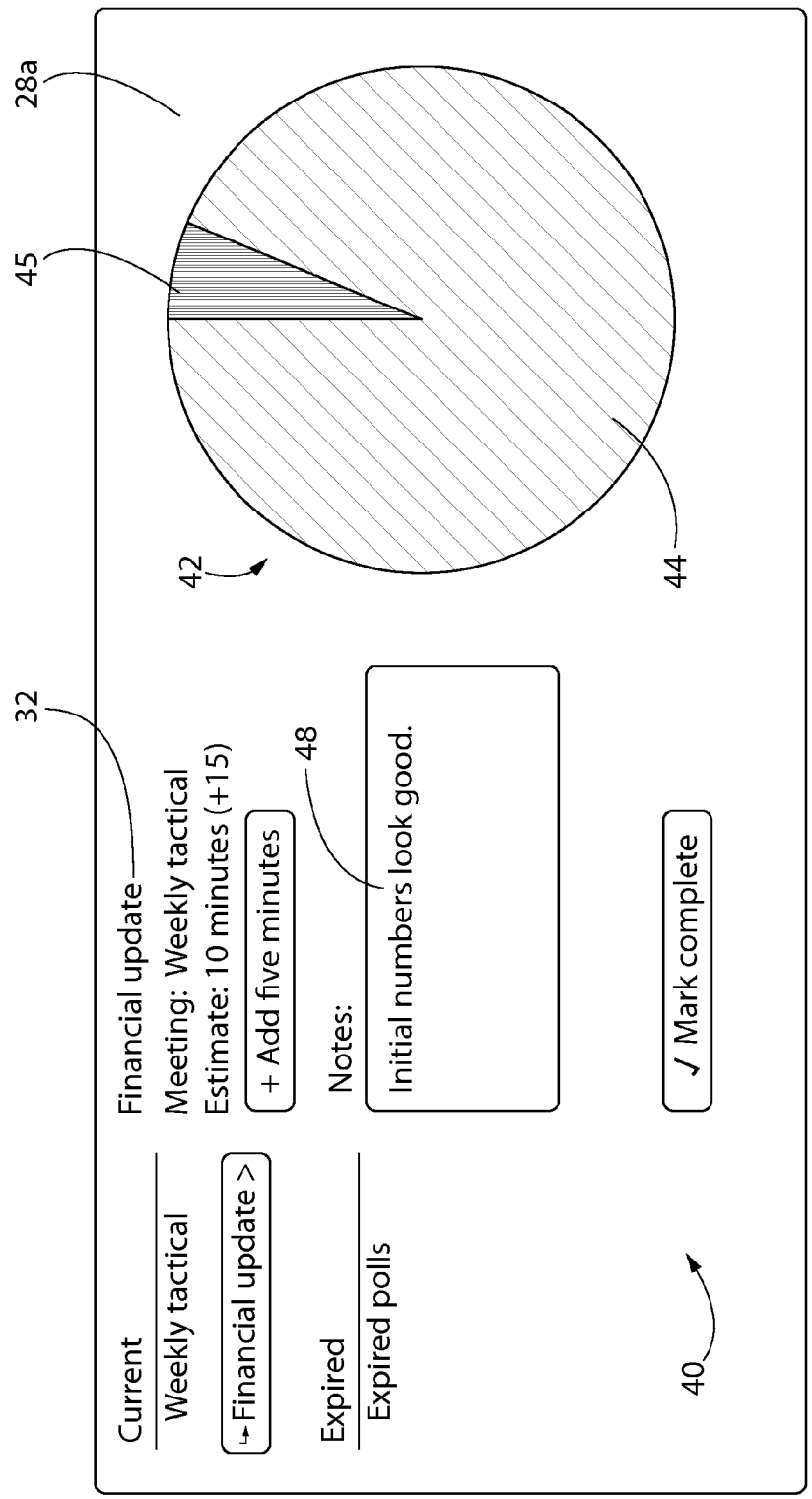
FIG. 5 shows a selected item display after the estimated time runs out according to one embodiment

FIG. 5 shows a selected item display 40 (of a meeting administrator user interface 28a) after the estimated time runs out according to one embodiment. This figure is similar to FIG. 5, but the estimated time has run out. Once again, the selected agenda item 32 is shown, along with notes 48, and an estimated time image 44 (in the shape of a circle). But in this figure, the timer display 42 has been completely filled in blue (to indicate the estimated time has elapsed), and a new time over portion 45 (red in the exemplified embodiment) appears that can update continuously (similar to the time elapsed portion 43 of FIG. 4) to indicate the time over the estimated time that has been used.

Further, because the estimated time has run out, a new add time option 46 has appeared. The add time option 46 can be any tool for adding additional time to the selected agenda item 32. In the exemplified embodiment, the add time option 46 is a button allowing a user to add five minutes to the selected agenda item 32. When the add time option 46 is used, the second list 50 of agenda items can be updated to display a new estimated time for the selected agenda item 32.

Figure 6:
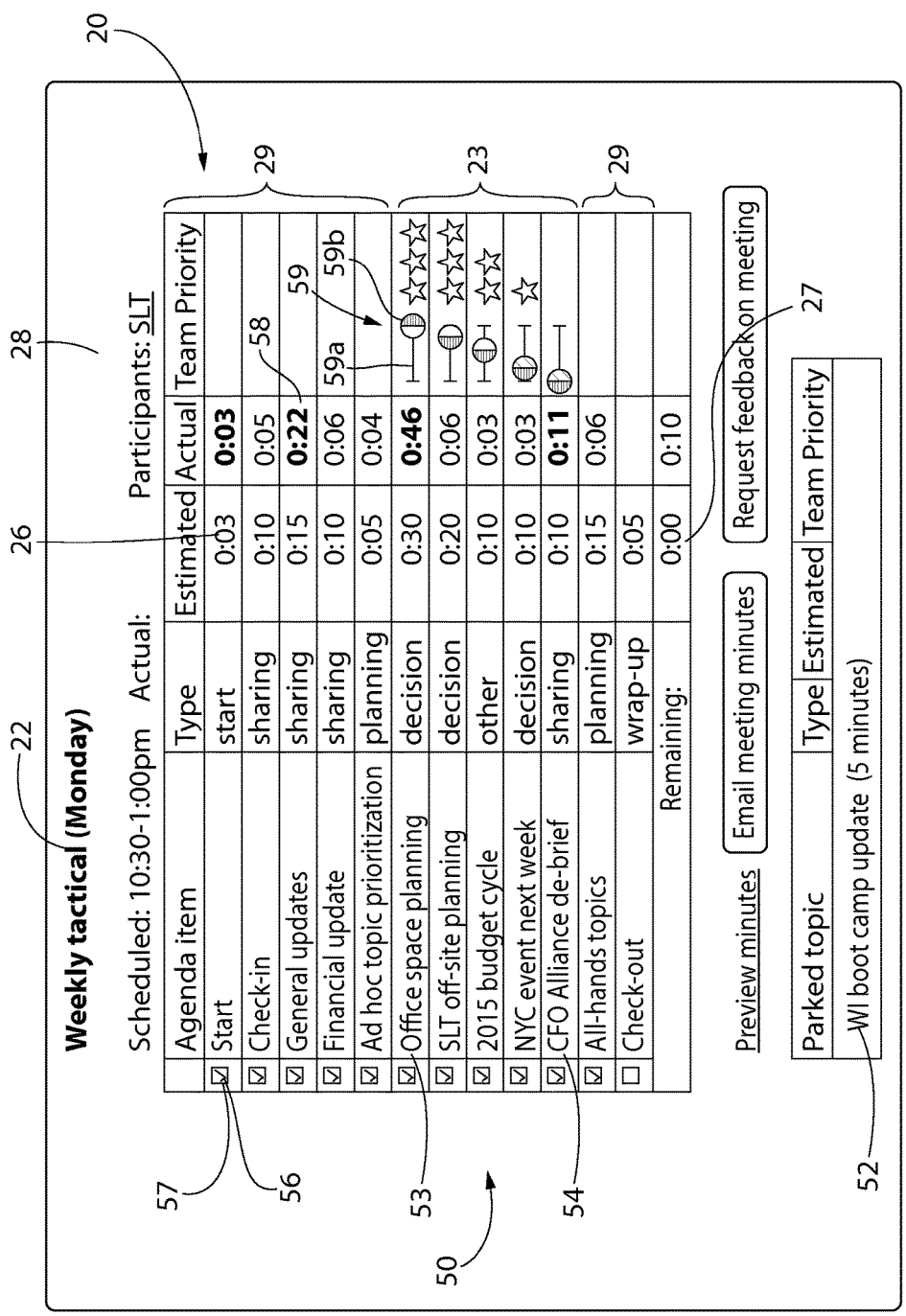
FIG. 6 shows a meeting agenda during a meeting according to one embodiment.

FIG. 6 shows a meeting agenda 20 (on a user interface 28 of a meeting participant) during a meeting according to one embodiment. Similar to FIG. 2, a meeting title 22, structural agenda items 29, and non-structural agenda items 23 are shown. Further, completion boxes 57 are shown. In this figure, all but the last completion box 57 includes a completion mark 56 (e.g., a check mark) indicating that all but the last agenda item have been completed.

Marking an agenda item 53 as completed can cause the estimated meeting time 27 to be recalculated based on when each agenda item 53 is marked as complete. This can allow the meeting administrator and meeting participants to be aware that the meeting is behind (or ahead of) schedule so that they can adjust their discussions and/or agenda appropriately. In the exemplified embodiment, the estimated meeting time 27 is the estimated amount of time remaining for the meeting. In other embodiments, the estimated meeting time 27 can be other times, such as the estimated duration of the meeting, or the estimated time of the day when the meeting will be completed.

Each agenda item 53 of the second list of agenda items 50 includes an estimated time 26. Further, each user interface of each meeting participant is configured to display (a) the estimated time 26 for each agenda item 53 of the second list of agenda items 50 and (b) an estimated meeting time 27 for all of the agenda items of the second list of agenda items 50. Each user interface indicates when the estimated time 26 for an agenda item 53 has been exceeded—for example, by the indication of the actual time 58 being shown as bolded.

Further, each agenda item 53 includes a space for an indication of the actual time 58 the agenda item 53 took. In this embodiment, if the actual time exceeds the estimated time 26, indication 58 of the actual time is bolded.

In this embodiment, the second list of agenda items 50 includes a new agenda item 54. This new agenda item 54 can be added by a meeting participant or meeting administrator before or during the meeting. Like other agenda items, the new agenda item 54 can include a name, estimated time, topic type, and/or description. The new agenda item 54 can be added to the second list of agenda items 50 in real-time, for example, shortly after being entered by a meeting participant during a meeting, and can receive item ratings.

Further, the user interface 28 includes a section showing a parked agenda item 52. In the exemplified embodiment, the meeting administrator can decide to park an agenda item for any reason (e.g., lack of time or lack of interest from the meeting participants). In other embodiments, an agenda item can be automatically parked (e.g., for low item ratings).

The meeting agenda 20 includes a second list of agenda items 50. The second list of agenda items 50 for the meeting can be transmitted (by the server or another device) to each user interface of each meeting participant in real-time. The second list of agenda items 50 is organized in a second order. The second list of agenda items 50 can comprise agenda items from the first list of agenda items 25 (see FIG. 2), but in a different order. The second order is based on the item ratings, as will be described in more detail below.

Before or at the start of the meeting, the user interface 28 shows the first list of agenda items 25 in a manner similar to that shown in FIG. 2. As item ratings are received, however, the non-structural agenda items 23 can be re-ordered in accordance with the item ratings received. For example, the agenda item "Office Space Planning" received the highest ratings, and therefore is positioned before the other non-structural agenda items 23.

In the exemplified embodiment, the non-structural agenda items 23 of the second list 50 include displayed priority ratings 49 based on the item ratings. The displayed priority ratings 59 can illustrate the positive or negative item ratings received for each agenda item 53. In the exemplified embodiment, the displayed priority rating 59 includes a symbol 59b (e.g., a circle) positioned on a line 59a. The further the symbol 59b is to the right of the line 59a, the more positive were the reviews of the agenda item 53. The position can be based on the log it score for the agenda item 53. The symbol 59b can also have a color based on the item ratings. For example, an agenda item 53 receiving very positive ratings could have a green circle, an agenda item 53 receiving very negative ratings could have a red circle, and an agenda item 53 receiving a mix of positive and negative ratings could have a mix of colors (such as green and yellow). In other embodiments, the displayed priority rating can use other symbols, numbers, or methods for indicating the received item ratings.

As discussed above with respect to FIG. 3, the system can use predetermined rating options 30 corresponding with an ordinal scale. In the exemplified embodiment, the red rating represents "Bad," the amber rating represents "Needs Improvement," the green rating represents "Good," and the star rating represents "Excellent." There are several methods that can be used for summarizing the item ratings to the ordinal scale so that groups of item ratings can be compared. In one example, a percent-positive method can be used. By this method, scale options are divided into positive and not-positive groups. The summary of the item ratings is the percentage of the responses that are positive.

In another example, successive integers (or other numbers) can be assigned to each of the scale options. The summary of the item ratings can then be the arithmetic mean, geometric mean, or median of the assigned integers.

In yet another example, log it scores can be used. For each non-structural agenda item of the first list of agenda items 25, the system can determine a log it score based on the received item ratings, and the second order of the second list 50 can be based on the log it score for each item of the first list of agenda items 25.

Table 1 provides an example of how log it scores can be determined. In this example, there were 10 item ratings—1 red, 2 amber, 4 green, and 3 star. The percentages these item ratings represent for the total item ratings are, respectively, 10%, 20%, 40%, and 30%. Because the scale lacks granularity, it is assumed that half the responses to a particular option were intended to be more positive then was able to be expressed (and that half were intended to be less positive). Thus, the percentile for each rating is calculated as half the percentage for the rating, plus the percentages of the lower ratings. Thus, the Bad percentile is 10%/2 (or 5%), The Needs Improvement percentile is 20%/2+10% (or 20%), the Good percentile is 40%/2+10%+20% (or 50%), and the Excellent percentile is 30%/2+10%+20%+40% (or 85%). The log it score can then be determined. The Bad log it score is −log((1/5%)−1) (or −1.3), the Needs Improvement log it score is −log((1/20%)−1) (or −0.6), the Good log it score is −log((1/50%)−1) (or 0), and the Excellent log it score is −log((1/85%)−1) (or 0.75).

TABLE 1

|  | Bad (red) | Needs improvement (amber) | Good (green) | Excellent (star) |
| --- | --- | --- | --- | --- |
| Response count | 1 | 2 | 4 | 3 |
| Percentage | 10% | 20% | 40% | 30% |
| Percentile | 5% | 20% | 50% | 85% |
| Logit score | −1.3 | −0.6 | 0 | 0.75 |

A summary score can then be obtained by applying the calculated log it scores to the response counts as follows:

Summary score=(−1.3)(1)+(−0.6)(2)+(0)(4)+(0.75)(3)
=−0.25

The summary score can then be compared to other summary scores for other agenda items to determine which agenda item received a higher rating. This approach helps to appropriately weight passion and outliers, which can lead to more reliable results.

It is noted that the above method of using log it scores for summarizing and comparing groups of responses to an ordinal scale can also be used for items other than meeting agenda items. Rather than an agenda item, a list of topics (such as survey topics) can be displayed in a first order. Users can be provided options for rating the topics according to an ordinal scale. For example, several survey questions about a workplace could be provided, and the options for rating each question could be Bad, Needs Improvement, Good, and Excellent. Log it scores can be determined using the method described above, and a summary score can be determined for each topic. Further, the survey topics could be reordered (similar to the re-ordering of the non-structural agenda items) based on the summary scores.

Further, the above method of determining log it scores for ordinal scale rating options can be based on benchmark data. For example, benchmark data from a similarly situated company can be used to determine the log it scores for each response option for each survey topic. These log it scores can then be applied to the responses of the company being surveyed, such that the summary score for a given topic is based on the response count for the company and the benchmark log it scores from the benchmark company (or companies). When using log it scores with a benchmark, the system can granularly adjust for variations in question wording and demographic characteristics of responders.

Returning to the figures, FIG. 7 show meeting minutes 60 according to one embodiment. The meeting minutes 60 can include the meeting title 22, the agenda items 53, and the notes 48 for each agenda item 53. The meeting minutes 60 can also show parked agenda items 52. The meeting minutes 60 can be viewed within an application or program, be emailed, or be communicated by other means. In the exemplified embodiment, the ability to preview and email meeting minutes 60 is enabled when the last agenda item it marked complete. The meeting minutes 60 can include additional data, such as time data captured when the agenda items were ended.

Figure 8:
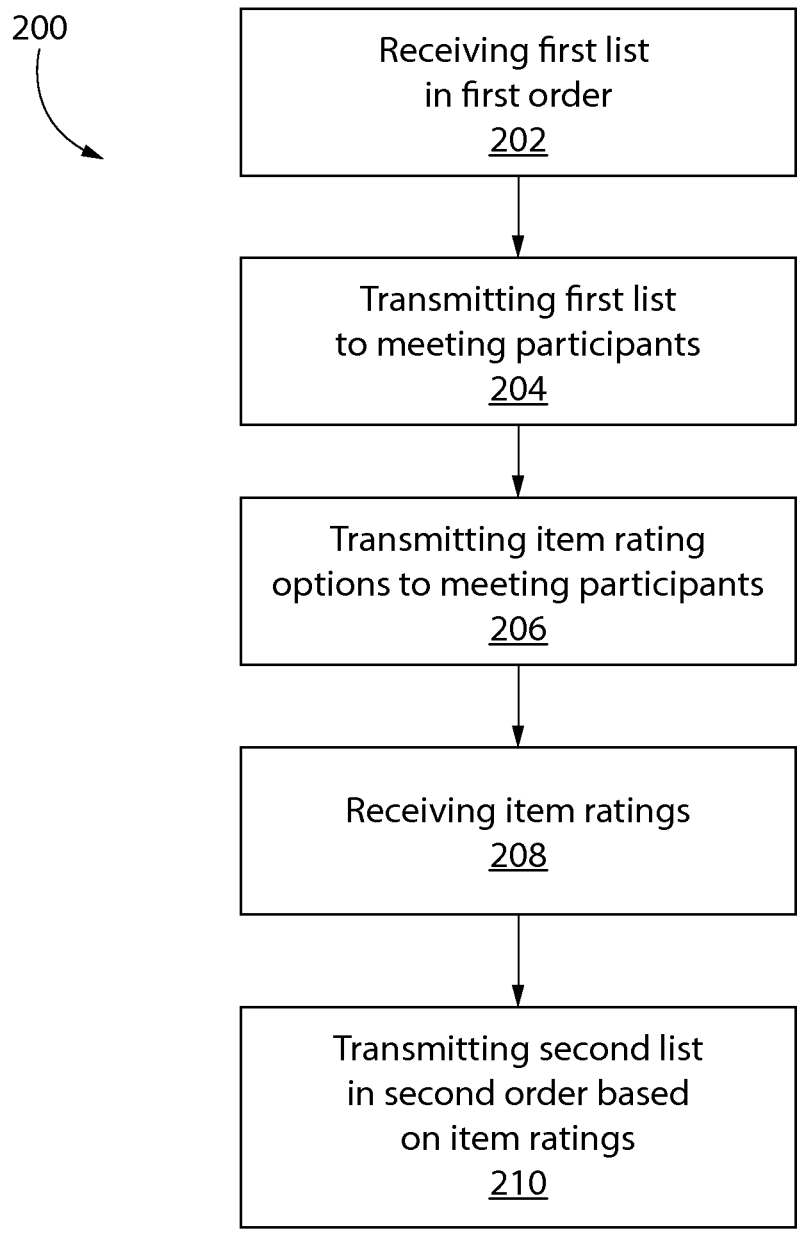
FIG. 8 is a flow chart for a method of updating a meeting agenda according to one embodiment.

FIG. 8 is a flow chart for a method of updating a meeting agenda according to one embodiment. The method can receive (from the meeting administrator device or another device) a first list of agenda items for a meeting, the first list of agenda items organized in a first order (step 202). Further, the method can transmit to the meeting participant devices the first list of agenda items (step 204). Further, the method can transmit to the meeting participant devices item rating options for rating each agenda item (step 206). Further, the method can receive from the meeting participant devices item ratings for at least one of the agenda items of the first list (step 208). Further, the method can transmit to the meeting participant devices a second list of agenda items for the meeting, the second list of agenda items comprising a second list of agenda items organized in a second order (step 210). The second list of agenda items can comprise agenda items from the first list of agenda items. Further, the second order of the second list of agenda items can be based on the item ratings. A server or another device can perform the above operations.

The embodiments discussed herein can provide several advantages. Meeting participants can influence a meeting agenda before or even during a meeting by rating agenda items. Items can be re-ordered, added, or removed based on participant feedback. Re-ordering can be done in real time, based on meeting discussions, time limitations, or other factors. Further, estimated times can be shown and updated, and notices can be provided indicating time remaining. Further, notes can be added during the meeting that automatically appear in later-generated meeting minutes. Further, meeting participants are more likely to be engaged because they feel some control over the agenda and the items being discussed. Further, the meeting and its agenda benefits from the feedback of all attending. Further, log it-based ordering can help to appropriately weight passion and outliers, which typically leads to more reliable results. Further, log it-based ordering can be used for non-meeting agenda items, such as survey topics. When using log it scores and benchmark data for item responses, the system can granularly adjust for variations in question wording and other factors, such as demographic characteristics of responders While the invention has been described with respect to specific examples, those skilled in the art will appreciate that there are numerous variations and permutations of the above described invention. It is to be understood that other embodiments may be utilized and structural and functional modifications may be made without departing from the scope of the present invention. Thus, the spirit and scope should be construed broadly as set forth in the appended claims.

What is claimed is:

1. A method comprising:
receiving a first list of agenda items for a meeting, the first list of agenda items organized in a first order;
transmitting the first list of agenda items to user interfaces of meeting participants;
providing, to each user interface of each meeting participant, access to predetermined item rating options, wherein each rating option is available for rating each agenda item;
receiving, from the meeting participants in real-time, item ratings for at least one of the agenda items of the first list;
for each item of the first list of agenda items, determining a log it score based on the item ratings, wherein the determination of the log it score comprises, for each rating option of each item, determining a logarithm of an odds value, the odds value based on a percentage of the item ratings being the rating option; and
transmitting, to each user interface of each meeting participant in real-time, a second list of agenda items for the meeting, the second list comprising a second list of agenda items organized in a second order;
wherein the second order is based on the log it score for each item of the first list of agenda items; and
wherein the second list of agenda items comprises agenda items from the first list of agenda items.

2. The method of claim 1 wherein the item ratings are received during the meeting.

3. The method of claim 1 wherein the first list of agenda items includes structural agenda items that are not subject to re-ordering.

4. The method of claim 1 wherein:
each agenda item of the second list of agenda items includes an estimated time;
each user interface of each meeting participant is configured to display (a) the estimated time for each agenda item of the second list of agenda items and (b) an estimated meeting time for all of the agenda items of the second list of agenda items; and
each user interface indicates when the estimated time for an agenda item has been exceeded.

5. The method of claim 4 wherein selection of one of the agenda items causes a timer display to show a time elapsed of the estimated time for the selected agenda item.

6. The method of claim 4 further comprising:
receiving from a meeting administrator device a request to add time to the estimated time for a selected agenda item; and
updating the second list of agenda items to display a new estimated time for the selected agenda item.

7. The method of claim 4:
wherein the agenda items are configured to be marked as complete; and
wherein the estimated meeting time is recalculated based on when each agenda item is marked as complete.

8. The method of claim 1 further comprising receiving in real-time a new agenda item from the meeting participants, the second list of agenda items including the new agenda item.

9. The method of claim 1 wherein the second list of agenda items does not include one agenda item from the first list of agenda items, the one agenda item removed by a meeting administrator.

10. The method of claim 1 wherein the predetermined rating options correspond with an ordinal scale.

11. The method of claim 1 wherein at least one of the agenda items of the second list includes a displayed priority rating based on the item ratings.

12. The method of claim 11 wherein the displayed priority rating for the at least one agenda item comprises a symbol at a position on a line, the position based on the log it score for the at least one agenda item.

13. The method of claim 1 wherein selection of one of the agenda enables the input of notes regarding the selected agenda item.

14. The method of claim 13 further comprising transmitting meeting minutes, the meeting minutes including the notes taken for selected agenda items.

15. A system comprising:
meeting participant devices;
a meeting administrator device; and
a server configured to:
receive, from the meeting administrator device, a first list of agenda items for a meeting, the first list of agenda items organized in a first order;
transmit to the meeting participant devices the first list of agenda items;
transmit to the meeting participant devices access to item rating options, wherein each rating option is available for rating each agenda item;
receive from the meeting participant devices item ratings for at least one of the agenda items of the first list;
for each item of the first list of agenda items, determine a log it score based on the item ratings, wherein the determination of the log it score comprises, for each rating option of each item, determining a logarithm of an odds value, the odds value based on a percentage of the item ratings being the rating option; and
transmit to the meeting participant devices a second list of agenda items for the meeting, the second list of agenda items comprising a second list of agenda items organized in a second order;
wherein the second order is based on the log it score for each item of the first list of agenda items; and
wherein the second list of agenda items comprises agenda items from the first list of agenda items.

16. A method comprising:
providing, to each user interface of a plurality of users, items displayed in a first order;
providing, to each user interface of the plurality of users, rating options for each item, wherein each rating option is available for rating each item, and wherein the rating options corresponding with an ordinal scale;
for each item, receiving item ratings from the plurality of users;
for each item, determining a log it score based on the item ratings wherein the determination of the log it score comprises, for each rating option of each item, determining a logarithm of an odds value, the odds value based on a percentage of the item ratings being the rating option; and providing, to each user interface of the plurality of users, the items displayed in a second order, the second order based on the log it score determined for each item.

17. The method of claim 16 wherein the item is a survey topic.

18. The method of claim 17 wherein the log it score is further based on benchmark data.

19. The method of claim 16 wherein the items displayed in the second order include displayed priority ratings based on the item ratings.

* * * * *